(No Model.)
T. W. PALMER.
DOUBLE SHOVEL PLOW.
No. 363,298. Patented May 17, 1887.
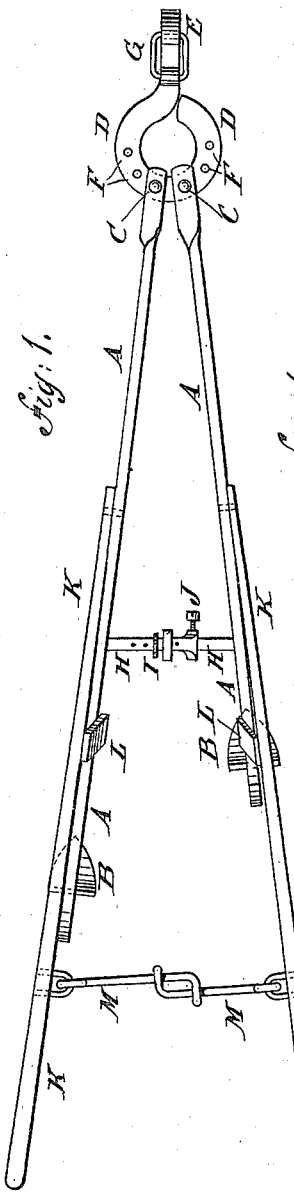
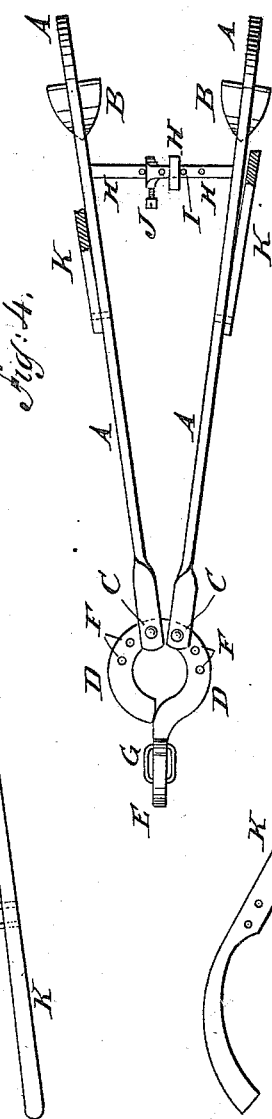
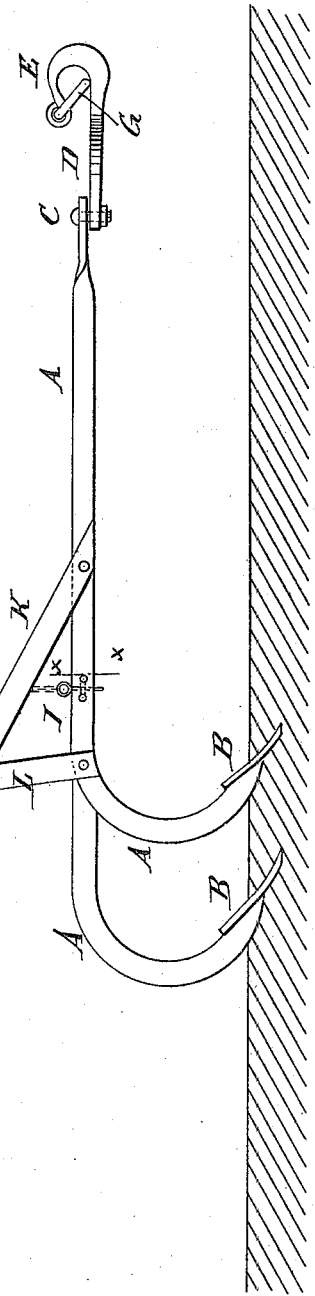
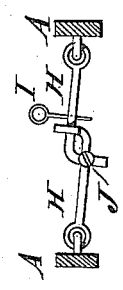
WITNESSES:
Chas. Nida
C. Sedgwick
INVENTOR:
T. W. Palmer
BY Munn & Co
ATTORNEYS.

UNITED STATES PATENT OFFICE.

THOMAS W. PALMER, OF CUBA, KENTUCKY, ASSIGNOR OF ONE-THIRD TO ELIZA M. COX, OF BIRMINGHAM, ALABAMA.

DOUBLE-SHOVEL PLOW.

SPECIFICATION forming part of Letters Patent No. 363,298, dated May 17, 1887.

Application filed March 30, 1886. Renewed April 13, 1887. Serial No. 234,713. (No model.)

*To all whom it may concern:*

Be it known that I, THOMAS W. PALMER, of Cuba, in the county of Graves and State of Kentucky, have invented a new and useful Improvement in Double-Shovel Plows, of which the following is a full, clear, and exact description.

Reference is to be had to the accompanying drawings, forming a part of this specification, in which similar letters of reference indicate corresponding parts in all the figures.

Figure 1 is a plan view of my improved double-shovel plow, shown as arranged for cultivating corn. Fig. 2 is a side elevation of the same. Fig. 3 is a sectional front elevation of a part of the same, taken through the line *x x*, Fig. 2. Fig. 4 is a plan view of the same, partly in section, and shown as arranged for cultivating cotton.

The object of this invention is to provide double-shovel plows constructed in such a manner that they will readily adjust themselves to level, inclined, or uneven ground, and which can be readily adjusted to cause the shovels to work at a greater or a less distance apart.

The invention consists in the construction and combination of various parts of the double-shovel plow, as will be hereinafter fully described.

A are the plow-beams, the rear ends of which are curved downward and have shovels B attached to them in the ordinary manner.

The forward ends of the plow-beams A are perforated to receive the pins or bolts C, that pivot them to the annular plate or bar D, formed upon or attached to the shank of the draw-hook E. Six (more or less) perforations, F, are formed in the annular bar D to receive the bolts C, so that the forward ends of the plow-beams A can be adjusted a greater or a less distance apart, as may be desired.

In an eye formed in the end of the draw-hook E is pivoted the end of the link G, the other end of which rests upon the shank of the said draw-hook to prevent the doubletree or whiffletree staple from becoming detached accidentally.

To the inner sides of the middle or rear part of the beams A are hinged the outer ends of short bars H, the inner ends of which are bent at right angles, one upward and the other downward, and are perforated or have eyes formed upon them to receive the other parts of the bars, as shown in Figs. 1, 3, and 4, so that the said beams can be moved toward or from each other to bring them to the required distance apart.

The bars H are secured in place when adjusted by pins I, inserted in holes in the said bars at the outer sides of the bent-over ends of the other bars, or by set-screws J, passing through the bent-over end of one bar H and resting against the side of the other bar. Both arrangements are illustrated in Figs. 1 and 3.

To the middle parts of the beams A are secured the forward ends of the handles K, which are supported at the desired height by the braces L, attached at their upper ends to the said handles and at their lower ends to the said beams.

To the inner sides of the upper parts of the handles K are hinged the outer ends of bars M, the inner ends of which are bent at right angles in opposite directions, and are perforated or have eyes formed upon them to receive the outer parts of the bars, so that the handles can be adjusted to correspond with the adjustment of the beams A.

The bars M, when adjusted, can be secured in place by pins or set-screws, as hereinbefore described with reference to the bars H.

With this construction the plows can adjust themselves to the surface of the ground, whether level, inclined, or uneven, so that the said plows can be readily guided and controlled, and can be adjusted for different-sized shovels, as the height of the plants may require.

When the plow is to be used for cultivating corn, both plows run between the same rows of plants, and one of the beams A is made shorter than the other, so that the soil thrown by one shovel will not interfere with the soil thrown by the other.

When the plow is to be used for cultivating cotton the plows are run upon the opposite sides of a row of plants, and in this case both beams A are made of the same length.

By this construction the farmer, by buying an extra beam, can have a double-shovel corn-plow and a double-shovel cotton-plow at a comparatively small expense.

Having thus fully described my invention, what I claim as new, and desire to secure by Letters Patent, is—

In a double-shovel plow, the combination, with the ends of the plow-beams and the draw-hook E, of the perforated annular bar D, formed upon the shank of the said draw-hook, and the bolts C, connecting the said annular bar and the said plow-beams, substantially as herein shown and described, whereby the forward ends of the plow-beams can be readily adjusted at the required distance apart, as set forth.

THOMAS W. PALMER.

Witnesses:
J. PHILIP DOLAN,
JULIUS ALLEN.